Sept. 22, 1925. 1,554,202

J. DIEHL

EDGER

Filed April 1, 1925

INVENTOR
John Diehl
BY C. Campbell Hunch
ATTORNEY

Patented Sept. 22, 1925.

1,554,202

UNITED STATES PATENT OFFICE.

JOHN DIEHL, OF JERSEY CITY, NEW JERSEY.

EDGER.

Application filed April 1, 1925. Serial No. 19,792.

*To all whom it may concern:*

Be it known that I, JOHN DIEHL, a citizen of the United States, and resident of Jersey City, in the county of Hudson and State of New Jersey, have invented certain new and useful Improvement in Edgers, of which the following is a specification.

This invention relates to a lawn edger.

In the spring particularly, lawns form hillocks and hollows as the frost leaves the ground, necessitating rolling which breaks down the edges of the grass plots. A number of other causes also injure the edges such as summer rains, natural growth of grass, individuals stepping on the edges, etc. In order that the lawns may have a trim and prepossessing appearance the edges of the grass plot in a well kept garden must be sharply defined. It has been the custom for a very many years to trim the edges by means of sheep shears. Such method is tiresome to the operator and slow.

One of the objects of this invention is to provide a garden tool that will obviate the necessity of stooping in the trimming of the edges of grass plots. Another object of this invention is to enable a gardener to trim the grass plot edges in a shorter period of time. Still another object of this invention is to provide an edger that will trim the edges and at the same time cut the stray blades of grass that grow in the paths adjoining the grass plots.

Referring to the drawings.

Figure 1:
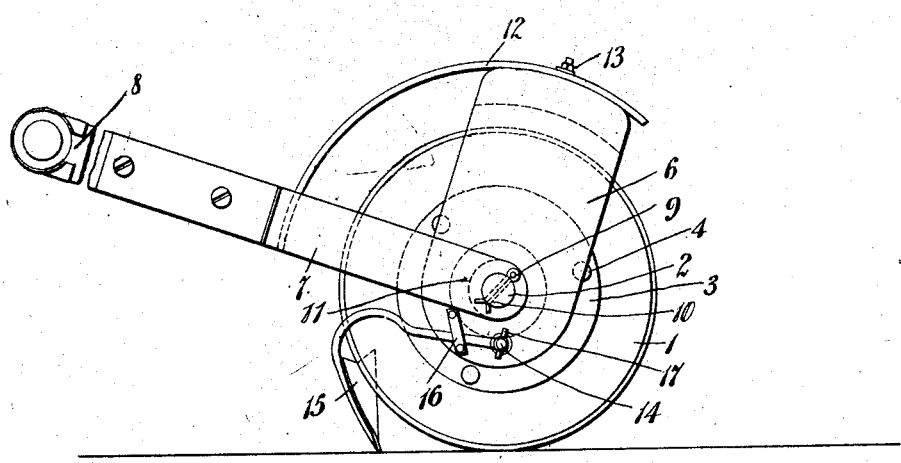
Figure 1 is a view in side elevation of a device embodying the principles of my invention.
Figure 2:
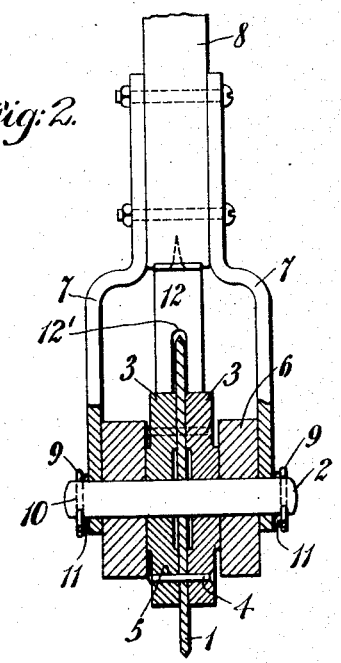
Figure 2 is a view in cross section of Figure 1.
Figure 3:
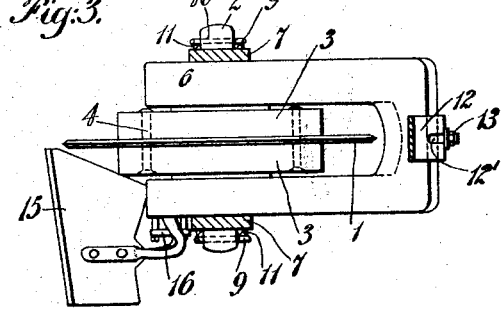
Figure 3 is a view in rear elevation of Figure 1, with the handle removed.

In carrying out my invention, I propose to provide a disc blade or cutter 1 journaled on an axle 2, and supported by disks 3 which are bolted by bolts 4 through holes 5 to disc 1, and to each other. A U shaped weight 6 is likewise journaled to axle 2 exteriorly of the three disks. Disks 3 and cutter disc 1, extend below the feet of U shaped weight 6 in order to permit of the rolling action of the cutter in trimming the edges of the lawn since the disks 3 support the device while upon the surface of the grass as disc 1 cuts. Exteriorly of weight 6 and likewise journaled to axle 2 are metal arms 7 bolted to handle 8. Cotter pins 9 secured in holes 10 of axle 2, prevent the withdrawal of axle 2. Washers 11 may be inserted between cotter pins 10 and metal arms 7. Bolted to handle 8 is a metal strap 12 forming an arc and having a channel 12' therein, within which bolt 13, adapted to be screwed into the top of weight 6, to permit of the relative adjustment of the weight with respect to the handle. The upper surface of weight 6 is formed with a corresponding arc so that it will not bind when adjustments are made with respect to its relative position in connection with strap 12. Adjacent the bottom of weight 6 is pivoted at 14, plow or scraper 15. Strap 16, which is secured to weight 6 by wing nuts 17, limits the arc of scraper 15, and when the wing nuts 17 are tightened up securely holds the plow 15 in position for operation. When it is desired to make a greater adjustment of the plow than is possible by means of strap 16, weight 6 can be shifted.

The operation of the device is as follows:

A proper adjustment is made of plow 15, and the operator places the edger on the edge of the grass plot to be trimmed, and grasping the handle 8 pushes the device. Disc 1 cuts the edge of the grass off while scraper 15 removes the stray blades of grass. The device is supported on the surface of the grass by disks 3 which roll. If desired, the edger may be guided by a string stretched along the edge of the grass plot but normally this will not be required since the operator is in a standing position and is thus able to see that he is trimming the edges in a stright line.

Figure 4:
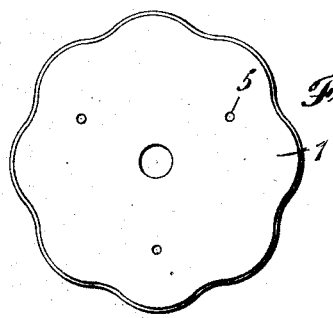
Figure 4 is a modified form of disc.

Modifications may be made in my invention and still fall within the scope thereof. I have shown a modified form of a cutting blade which has a scalloped or toothed edge in Figure 4.

What I claim is:—

1. An edger comprising a handle, arms secured to the face of said handle, an axle carried by said arms, a U shaped weight between said arms and journaled to said axle, a disc carried by said axle and adapted to rotate between the legs of said weight.

2. An edger comprising a handle, an axle carried by said handle, a U shaped weight journaled to said axle, rotatable disks to support the weight of said device and a cutting disc secured between said rotatable disks, said disks journaled to said axle.

3. An edger comprising a handle, an axle carried by said handle, a U shaped weight journaled to said axle, means for adjusting said weight in a predetermined position with respect to said handle, rotatable disks carried by said axle, a cutting disc between said rotatable disks and secured thereto to rotate therewith.

4. An edger comprising a handle, an axle journaled in said handle, an adjustable U shaped weight journaled on said axle, an adjustable plow carried by said weight, rotatable disks journaled on said axle to support the weight of the edger and a cutting disc between said rotatable disks and adapted to rotate therewith.

5. An edger comprising a handle, an axle journaled in said handle, a U shaped weight journaled on said axle, a plow secured to said weight, means for adjusting the position of the plow with respect to said weight, means for adjusting the position of the plow and the weight with respect to said handle, rotatable disks journaled on said axle to support the weight of the edger upon the surface of the grass, and a cutting disc between said rotatable disks, said cutting disc adapted to rotate with said rotatable disks.

Signed at New York in the county of New York and State of New York this 21st day of March A. D. 1925.

JOHN DIEHL.